(12) United States Patent
White

(10) Patent No.: US 8,949,305 B1
(45) Date of Patent: Feb. 3, 2015

(54) DISTRIBUTED DYNAMIC SYSTEM CONFIGURATION

(75) Inventor: Philip White, San Mateo, CA (US)

(73) Assignee: Scale Computing, Inc., Indianapolis, IN (US)

( * ) Notice: Subject to any disclaimer, the term of this patent is extended or adjusted under 35 U.S.C. 154(b) by 201 days.

(21) Appl. No.: 13/184,283

(22) Filed: Jul. 15, 2011

(51) Int. Cl.
*G06F 15/16* (2006.01)

(52) U.S. Cl.
USPC ............................ 709/201; 709/202; 709/203

(58) Field of Classification Search
USPC .................................................. 709/201–203
See application file for complete search history.

(56) References Cited

U.S. PATENT DOCUMENTS

| | | | |
|---|---|---|---|
| 5,761,669 A | 6/1998 | Montague et al. | |
| 6,023,706 A | 2/2000 | Schmuck et al. | |
| 6,085,244 A | 7/2000 | Wookey | |
| 6,112,225 A * | 8/2000 | Kraft et al. | 709/202 |
| 6,275,898 B1 | 8/2001 | DeKoning et al. | |
| 6,675,258 B1 | 1/2004 | Bramhall et al. | |
| 6,760,743 B1 * | 7/2004 | Heddes et al. | 718/100 |
| 6,775,824 B1 | 8/2004 | Osborne et al. | |
| 6,961,937 B2 | 11/2005 | Avvari et al. | |
| 6,968,382 B2 | 11/2005 | McBrearty et al. | |
| 6,981,102 B2 | 12/2005 | Beardsley et al. | |
| 7,080,377 B2 * | 7/2006 | Peled et al. | 718/102 |
| 7,165,189 B1 | 1/2007 | Lakkapragada et al. | |
| 7,343,587 B2 | 3/2008 | Moulden et al. | |
| 7,370,101 B1 | 5/2008 | Lakkapragada et al. | |
| 7,373,438 B1 | 5/2008 | DeBergalis et al. | |
| 7,409,497 B1 | 8/2008 | Kazar et al. | |
| 7,426,729 B2 | 9/2008 | Avvari et al. | |
| 7,457,880 B1 | 11/2008 | Kim | |
| 7,574,464 B2 | 8/2009 | Hitz et al. | |
| 7,730,119 B2 * | 6/2010 | Bates et al. | 709/201 |
| 7,937,421 B2 | 5/2011 | Mikesell et al. | |
| 7,991,969 B1 | 8/2011 | Chatterjee et al. | |
| 8,315,999 B2 * | 11/2012 | Chatley et al. | 707/705 |
| 2002/0023118 A1 * | 2/2002 | Peled et al. | 709/104 |
| 2002/0099716 A1 * | 7/2002 | Thompson | 707/102 |
| 2002/0138559 A1 | 9/2002 | Ulrich et al. | |
| 2003/0191795 A1 * | 10/2003 | Bernardin et al. | 709/105 |
| 2004/0148138 A1 | 7/2004 | Garnett et al. | |
| 2005/0246612 A1 | 11/2005 | Leis et al. | |
| 2005/0273659 A1 | 12/2005 | Shaw | |
| 2005/0278576 A1 | 12/2005 | Hekmatpour | |
| 2006/0041780 A1 | 2/2006 | Budaya et al. | |
| 2008/0021951 A1 | 1/2008 | Lurie et al. | |
| 2012/0158816 A1 * | 6/2012 | Choi et al. | 709/201 |
| 2013/0067294 A1 | 3/2013 | Flynn et al. | |

* cited by examiner

*Primary Examiner* — Brian P Whipple

(57) ABSTRACT

Reliably making configuration changes to distributed systems, including receiving commands for multiple configuration changes, subdividing configuration changes into separate tasks, and performing those tasks at each node. A configuration element receives sets of configuration change commands, acknowledging them so the user need not wait before issuing additional commands. Tasks are determined, each including consistent changes to system configuration, and each including single-device tasklets. Each particular tasklet might be assigned to a particular single device, or to any single device in the system. Next tasks are performed when tasklets are complete. If tasklets are not timely performed due to nodes which are relatively unresponsive, those nodes are marked "failed." When a failed node returns to responsiveness, it marks itself "recovering." When a recovering node catches up, it marks itself "operational." Updates by failed or recovering nodes are skipped while synchronizing with operational nodes.

24 Claims, 2 Drawing Sheets

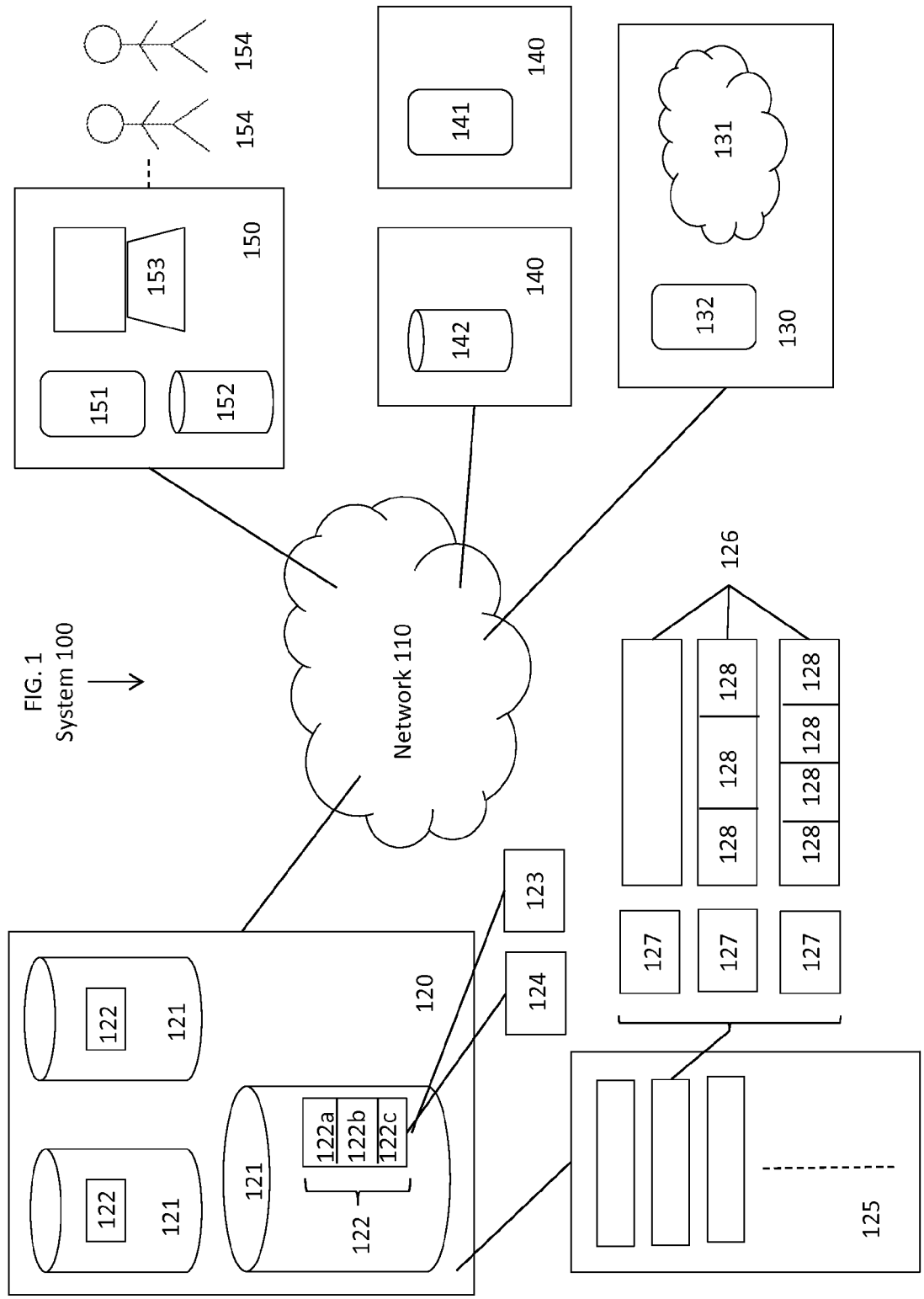

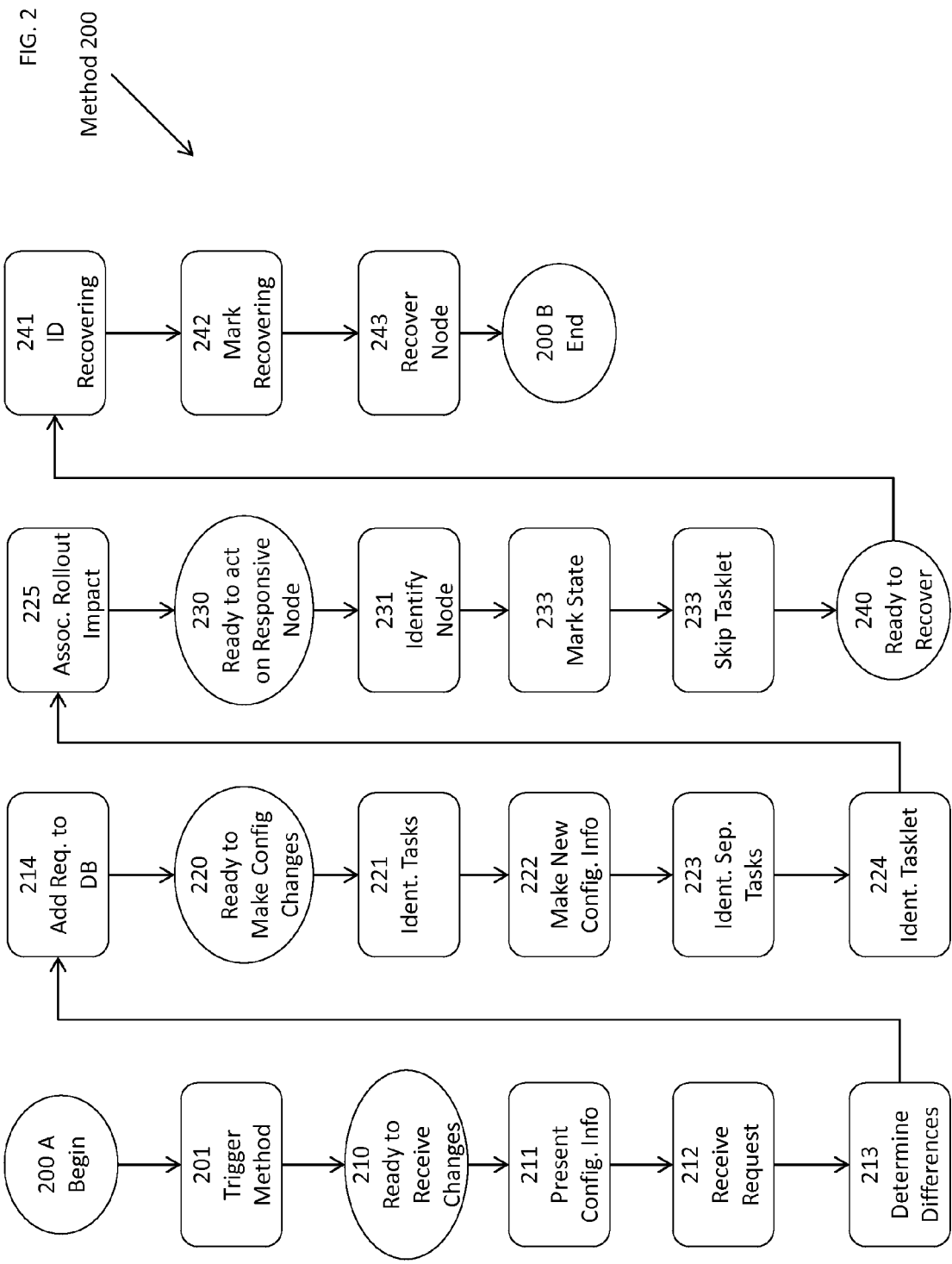

DISTRIBUTED DYNAMIC SYSTEM CONFIGURATION

BACKGROUND

Distributed computing systems include multiple components, also called "nodes," each particular one of which typically includes information about its state, particularly including information for configuring that particular node. For example, each particular node typically includes information for initializing that particular node. When configuring a distributed computing system, each of the nodes requiring configuration information are involved in the process of configuration.

A first problem in the known art can occur when one of those multiple nodes is non-responsive. For just some examples, a node in a computer network might have crashed, might be powered-down, might be suspended (either by its operator or otherwise), might be too busy to timely respond, or might be unable to achieve connectivity with the rest of the distributed system. When this occurs, configuration of the distributed system waits for the non-responsive node to become responsive again. This can present one of several problems. First, making a configuration change made to the distributed system waits for that non-responsive node to become responsive again, possibly taking a very long time. Second, if a configuration change is needed to bring the non-responsive node back into the system, manual intervention might be needed, such as by an operator for the distributed system.

Known systems include making such configuration changes manually, that is, by having an operator change the configuration information in use by various nodes in the distributed system by editing configuration information at each node, or substituting new configuration information at each node. While these known systems might be able to adequately make configuration changes, they are subject to at least the following drawbacks. First, making configuration changes manually is relatively slow, at least in the sense that operator changes to the configuration information at each node involve relatively many operations to be performed by that operator. Second, making configuration changes manually is relatively subject to error, at least in the sense that it is relatively probable that a human operator will make incorrect changes, or will make changes which are inconsistent across the distributed system.

A second problem in the known art can occur when attempting to make more than one change to the configuration of the distributed system. For just one example, after making a first configuration change, an operator for the distributed system might desire to make a second configuration change. If each of the nodes requiring configuration information is involved in each configuration change, that operator must wait for the first configuration change to finish before starting the second configuration change.

SUMMARY OF THE DESCRIPTION

We provide techniques for reliably making changes to configuration information for distributed systems. These techniques might include receiving commands for multiple such configuration changes, subdividing those configuration changes into separate tasks to be performed, and performing those separate tasks at substantially each node in the distributed system.

In one embodiment, a configuration element receives commands from an operator or other user, regarding a set of configuration changes to be made. The configuration element might receive one or more sets of such commands, in an order as entered by the user. For each set of commands, the configuration element returns substantially immediately to the user with an acknowledgement of receipt of those commands, and with an acknowledgement that the commands are about to be performed. We provide a techniques in which there is no particular need to force the user to wait for any one set of commands to complete, before issuing additional such commands.

The configuration element, in response to each set of commands, determines a set of tasks to be performed to make changes to configuration information for the system. In one embodiment, each task includes a change which, if performed, makes a consistent change to configuration information for the system. In one embodiment, each task includes one or more tasklets, each of which can be performed at a single device. In many cases, each particular tasklet is assigned to an associated particular single device; however, in some cases, one or more particular tasklets are assigned to be performed by any single device in the distributed system. Performing all tasklets assigned to a task implies the entire task is complete; the configuration element moves on to a next task.

Each change to configuration information includes changes, either to one or more databases identifying configuration information for the distributed system, or to one or more databases identifying configuration information for individual nodes associated with the system, some combination or conjunction thereof, or otherwise. In one embodiment, databases identifying configuration information for the distributed system include information identifying tasks and tasklets, as described above. In one embodiment, configuration information for individual nodes include configuration files, for example without limitation, initialization files, to be used by those individual nodes during operation, at a start of operation, some combination or conjunction thereof, or otherwise.

In one embodiment, the databases identifying configuration information for the distributed system also identify whether those tasks and tasklets to make changes to that configuration have been performed. If the configuration element identifies any tasks or tasklets which are not timely performed, it determines whether the nodes to which those tasks have been assigned are still operational in a substantially timely manner. If the configuration element identifies any nodes whose tasklets are unlikely to be substantially timely performed, the configuration element marks those nodes as "failed," or an equivalent thereof. When a failed node returns to being responsive, it determines if it is lagging operation for making changes to configuration information; if so, it marks itself as "recovering," or an equivalent thereof. When a recovering node catches up with changes to configuration information, it marks itself as "operational," or an equivalent thereof. In one embodiment, the configuration element skips updates by failed or recovering nodes, while synchronizing with operational nodes.

While this application sometimes describes particular errors, inconsistencies, or tests relating to particular hardware or software, there is no intent to restrict the description to the specific concerns mentioned, or to the specific hardware or software mentioned. In general, references to any particular concerns should be read as applicable to other and further concerns, whether of a similar nature or otherwise. In general, references to any particular hardware or software should be read as applicable to software (instead of hardware), or hardware (instead of software), or to some combination or conjunction thereof, whether of a similar nature or otherwise.

DESCRIPTION

Generality of the References

This application should be read in the most general possible form. This includes, without limitation, the following:

References to contemplated causes and effects for some implementations do not preclude other causes or effects that might occur in other implementations.

References to one embodiment or to particular embodiments do not preclude alternative embodiments or other embodiments, even if completely contrary, where circumstances would indicate that such alternative embodiments or other embodiments would also be workable.

References to particular hardware or software should be read as also applicable to software (instead of hardware), or hardware (instead of software) or to some combination or conjunction thereof, whether of a similar nature or otherwise.

References to particular reasons or to particular techniques do not preclude other reasons or techniques, even if completely contrary, where circumstances would indicate that the stated reasons or techniques are not as applicable.

References to "preferred" techniques generally mean that the inventors contemplate using those techniques, and think they are best for the intended application. This does not exclude other techniques for the invention, and does not mean that those techniques are necessarily essential or would be preferred in all circumstances.

References to specific techniques include alternative and more general techniques, especially when discussing aspects of the invention, or how the invention might be made or used.

Generality of the Techniques

Technologies shown or suggested by this description should also be thought of in their most general possible form. This includes, without limitation, the following:

The phrases and terms "causing," "directing," "instructing," "to cause," "to direct," "to instruct" (and similar phrases and terms) generally indicates any technique in which one or more first devices or methods induce one or more second devices or methods to take action, whether or not that action is assured (for example and without limitation, including a message, a posted change to a data structure, or otherwise).

The terms "command" or "instruction" (and similar phrases and terms) generally indicate any information or other arrangement or disposal or matter or energy, having the property of being interpretable by a computing device, or other device, to perform operations (possibly conditional operations, parallel operations, pipelined operations, or other dispositions of method steps or operations as might be known or developed in the many fields of computing science), whether or not responsive to inputs, states or state-changes, or other instructions, from any source whatever, or otherwise, or combinations or conjunctions thereof.

The phrases and terms "constantly," "continually," "from time to time," "occasionally," "periodically" (and similar phrases and terms) generally indicate any case in which a method or technique, or an apparatus or system, operates over a duration of time, including without limitation any case in which that operation occurs only part of that duration of time. For example and without limitation, these terms would include, without limitation, methods which perform an operation as frequently as feasible, on a periodic schedule such as once per second or once per day, in response to an alarm or trigger such as a value reaching a threshold, in response to a request or an implication of a request, in response to operator intervention, otherwise, and to combinations and conjunctions thereof.

The phrases and terms "data," "information" (and similar phrases and terms) generally indicate any form of bits/digits or values (whether analog, digital, or otherwise), collection or content, coincidence or correlation (whether causal or otherwise), evidence or logical tendency (whether probabilistic, pseudo-probabilistic or otherwise), or other indication of any kind from which a computing device, Turing-equivalent device, user, Artificial Intelligence, or other thinking being, might be able to draw conclusions.

The phrases and terms "data structure," "database" (and similar phrases and terms) generally indicate any element in a computing device, or storage device, or other device, capable of maintaining or identifying information (for example but without limitation, data or instructions, status information, synchronization information, and combinations or conjunctions thereof) for possible use by a computing device or process.

The phrases and terms "distribute," "to distribute" (and similar phrases and terms) generally indicate any case in which one or more first devices or methods, induce information (for example but without limitation, data or instructions) to appear at one or more second devices or methods, whether or not that information is assured to appear thereat (for example and without limitation, including a message, a posted change to a data structure, or otherwise).

The phrases and terms "effect," "with the effect of" (and similar phrases and terms) generally indicate any natural and probable consequence, whether or not assured, of a stated arrangement, cause, method, or technique, without any implication that an effect or a connection between cause and effect are intentional or purposive.

The phrases and terms "methods, physical articles, and systems," "techniques" (and similar phrases and terms) generally indicate any material suitable for description, including without limitation all such material within the scope of patentable subject matter, or having ever been considered within the scope of patentable subject matter, or which might colorably be within the scope of patentable subject matter, notwithstanding most recent precedent.

The phrase "on its own initiative" (and similar phrases and terms) generally indicates that one or more devices or methods operate without instruction from an external source. For example and without limitation, a first device might operate "on its own initiative" if it acts responsive to data or instructions at that first device, or responsive to data or instructions accessible by that first device, or otherwise without being explicitly directed by a second devices.

The phrases and terms "pseudo-random," "random" (and similar phrases and terms) generally indicate any technique of any kind, in which information is generated or selected in a manner not predictable to the recipient. In the context of the invention, data, information, numbers, processes, or otherwise, referred to herein as "random," need not be equidistributed (or have any other particular distribution) over anything in particular, and might in general be pseudo-random in addition to, or in lieu of, being random.

The term "relatively" (and similar phrases and terms) generally indicates any relationship in which a comparison is possible, including without limitation "relatively less," "relatively more," and the like. In the context of the invention, where a measure or value is indicated to have a relationship "relatively," that relationship need not be precise, need not be well-defined, need not be by comparison with any particular or specific other measure or value. For example and without limitation, in cases in which a measure or value is "relatively increased" or "relatively more," that comparison need not be with respect to any known measure or value, but might be with respect to a measure or value held by that measurement or value at another place or time.

The term "substantially" (and similar phrases and terms) generally indicates any case or circumstance in which a determination, measure, value, or otherwise, is equal, equivalent, nearly equal, nearly equivalent, or approximately, what the measure or value is recited. The terms "substantially all" and "substantially none" (and similar phrases and terms) generally indicate any case or circumstance in which all but a relatively minor amount or number (for "substantially all") or none but a relatively minor amount or number (for "substantially none") have the stated property. The terms "substantial effect" (and similar phrases and terms) generally indicate any case or circumstance in which an effect might be detected or determined.

The phrases "this application," "this description" (and similar phrases and terms) generally indicate any material shown or suggested by any portions of this application, individually or collectively, including all documents incorporated by reference or to which a claim of priority can be made or is made, and include all reasonable conclusions that might be drawn by those skilled in the art when this application is reviewed, even if those conclusions would not have been apparent at the time this application is originally filed.

The invention is not in any way limited to the specifics of any particular examples disclosed herein. After reading this application, many other variations are possible which remain within the content, scope and spirit of the invention; these variations would be clear to those skilled in the art, without undue experiment or new invention.

Real-World Nature

The invention includes techniques, including methods, physical articles, and systems, that receive world information dictated by real-world conditions (not mere inputs to a problem-solving technique). The techniques provided by the invention are transformative of the information received, at least in the senses that a first type of information (information provided as part of configuration changes, such as for example data and instructions) is transformed into actions responsive to that first type of information; and those actions responsive to that first type of information provide a second type of information (new configuration information).

The invention also includes techniques that are tied to a particular machine, at least in the sense that a system includes particular types of elements (configuration changes, configuration databases, and nodes having particular configuration information, such as for example as described herein); and a system that responds in distinct and defined ways in response to data and instructions regarding configuration changes, such as for example as described herein.

This description includes a preferred embodiment of the invention with preferred process steps and data structures. After reading this application, those skilled in the art would recognize that embodiments of the invention can be implemented using general purpose computing devices or switching processors, special purpose computing devices or switching processors, other circuits adapted to particular process steps and data structures described herein, or combinations or conjunctions thereof, and that implementation of the process steps and data structures described herein would not require undue experimentation or further invention.

DEFINITIONS AND NOTATIONS

The following definitions are exemplary, and not intended to be limiting in any way:

The phrase "active configuration" (and similar phrases and terms) generally indicates data and information associated with or relating to configuration information currently valid for that system. In general, the active configuration need not necessarily be identical to configuration information indicated by a configuration database for that system; in such cases, a local copy of that configuration database might be maintained on substantially each node for which that active configuration is valid.

The phrase "active version" of a system (and similar phrases and terms) generally indicates an identifier for that active configuration. In one embodiment, the active version includes an integer which is monotonically increased with each substantial configuration change.

The phrase "cluster configuration information" (and similar phrases and terms) generally indicates a set of configuration information maintained by a clustered file system.

The phrase "local configuration information" (and similar phrases and terms) generally indicates a set of configuration information maintained by a local file system for a particular node in a system.

The phrase "configuration database" (and similar phrases and terms) generally indicates a data structure maintaining a configuration information for a system. For example and without limitation, in cases in which users queue configuration changes for the system, the configuration database would include a set of configuration information to be maintained as the active configuration after substantially all those queued configuration changes are performed.

The phrase "configuration version" (and similar phrases and terms) generally indicates an identifier for a configuration associated with that configuration database. In one embodiment, the active version includes an integer which is monotonically increased with each substantial configuration change.

The phrase "configuration element" (and similar phrases and terms) generally indicates a software element, such as supported by hardware devices, capable of performing configuration operations for a particular node in a system.

The phrases "configuration rollout," "rollout" (and similar phrases and terms) generally indicate any action to be performed which has the effect of altering, changing, modifying, or replacing configuration information, or otherwise bringing configuration information into conformance with a configuration change.

The phrase "rollout data," (and similar phrases and terms) generally indicate any data or information, or associated method or technique, involved in persisting configuration changes at one or more nodes in a distributed system.

The phrase "impact" (and similar phrases and terms) generally indicates any action to be performed to configure, initialize, reconfigure, or otherwise alter the state of, a particular service available on a system.

In one embodiment, an "impact" generally refers to actions to be performed after rollout data is written.

The phrase "full impact" (and similar phrases and terms) generally refers to any impact for which, after performance, its targeted service should be performing according to an active configuration.

The phrase "incremental impact" (and similar phrases and terms) generally refers to any impact for which, after performance, its targeted service need not be performing according to an active configuration, but should be performing with substantially necessary configuration changes, without substantial service disruption.

The phrase "local state" (and similar phrases and terms) generally indicate any component or element, or aspect of the system, referring to data or information present at, included in, or accessible to, a hardware device or software element.

The term "resource" (and similar phrases and terms) generally indicate any component or element, or aspect of the system, whether a hardware device or a software element, or including a combination or conjunction thereof.

The phrases and terms "state", "state of a system" (and similar phrases and terms) generally indicate any data or information, having a bearing on any aspect of element of a system, including without limitation possibly representing only a portion or a subsystem thereof.

The terms "task," "tasklet" (and similar phrases and terms) generally indicate any method or technique, or associated data or information, involved in individual portions of a configuration change. For example and without limitation, a task might refer to an individual action involved in a configuration change, while a tasklet might refer to an action by an individual node involved in a configuration change.

The phrases "task ID," "tasklet ID" (and similar phrases and terms) generally indicate identifiers for tasks and tasklets, respectively.

The phrase "task tag" (and similar phrases and terms) generally indicate an identifier which might be used to group similar tasks. For example and without limitation, substantially each task associated with a particular configuration change would have a task tag also associated with that particular configuration change.

In one embodiment, a task might indicate a file system operation, such as for example creation or deletion of shared directories or file sets, creation or deletion of rollout data, performing a particular system command or process. A particular task might include one or more tasklets, such as for example substantially similar operations to be performed on more than one node in a system. A particular configuration change might include one or more such tasks.

In one embodiment, a tasklet might indicate a portion of a task, to be performed at a selected node in a system (or any one of a set of such selected nodes), or to be performed at a selected time.

After reading this application, those skilled in the art would recognize that these definitions would be applicable to techniques, methods, physical elements, software elements, combinations or conjunctions of physical elements and software elements, and systems—currently known, or not currently known to be applicable by the techniques described herein—extensions thereof that would be inferred by those skilled in the art after reading this application, even if not obvious to those of ordinary skill in the art before reading this application.

Figures and Text

Where described as shown in a figure, one or more elements might include other items shown in the figure in addition to, or operating in combination or conjunction with, those particular one or more elements (or that those particular one or more elements in combination or conjunction with one or more other elements, whether shown or not shown in the figure, and whether described or not described with respect to the figure);

one or more other elements not shown in the figure, but whose inclusion would be known to those skilled in the art, or which would be known after reasonable investigation, without further invention or undue experimentation; and subparts of those one or more elements, whether shown or not shown in the figure, which might be convenient for operation of those one or more elements, but which are not necessarily required in the described context, or which might be necessary for operation of those one or more elements in the described context, but which are not necessary for description at a level understandable to those skilled in the art.

Where described or shown in a figure, apparatus elements might include physical devices having the properties described or carrying out the functions associated therewith; such physical devices might include electronic circuits or other physical devices, whether specially designed for those properties or functions, or whether more generally designed and where adapted or configured for those properties or functions;

electronic or other circuitry operating under control of software elements, those software elements being embodied in a physical form for at least a duration of time, with the effect that the electronic or other circuitry has the properties or functions associated therewith when operating under control of those software elements;

software components having the properties described or carrying out the functions associated therewith; such software components might include information interpretable as instructions, associated with devices capable of performing those instructions, whether specially designed for those functions or instructions, or whether more generally designed and where adapted or configured for those functions or instructions.

Where described or shown in a figure, apparatus elements, including either physical elements or software components, might be coupled in a manner as shown in the figure, or where no specific coupling is shown, in a manner known to those skilled in the art (for example and without limitation, apparatus elements might be coupled mechanically, electronically, electromagnetically, or by one or more other techniques known to those skilled in the art, either in the alternative or in combination or conjunction, whether or not obvious at the time of this description, while software components might be coupled using any of the techniques known in the many fields of computer science, with or without assistance of additional software components, operating system elements, or by one or more other techniques known to those skilled in the art, either in the alternative or in combination or conjunction, whether or not obvious at the time of this description);

in a manner as described in text referring to the figure, or where no specific coupling is described, in a manner known to have the properties or functions associated therewith, in at least some contexts as contemplated by the inventors or as implied by the description;

in a manner other than as shown in the figure, or other than as described in the text, where the figure or text indicates that other such manners might be contemplated in the making or use of the invention, either in the alternative or in combination or conjunction, whether or not obvious at the time of this description;

in a manner other than as shown in the figure, or other than as described in the text, where adaptation or configuration thereof might be involved in the properties or functions associated therewith.

For example and without limitation, where a context for making or use of the invention might involve a distinct adaptation or configuration thereof, those apparatus elements or software components might be so adapted or so configured to have, or to substantially approximate, properties or functions as described herein, or as would be known to those skilled in the art.

Where described or shown in a figure, flow labels, method steps, and flow of control might include
- one or more physical devices operating in combination or conjunction to perform the operations described, with the properties or functions thereof;
- one or more portions of a single device, or of a set of devices coupled or in communication, or otherwise operating in combination or conjunction thereof, to perform the operations described, with the properties or functions thereof;
- one or more software components operating in combination or conjunction, or with the assistance of other known techniques known in the many fields of computer science, to perform the operations described, with or without assistance of additional software components, such as for example operating system elements, firmware elements, or related elements.

For example and without limitation, one or more software threads, processes, data structures, or other constructs known in the many fields of computing sciences and engineering, coupled or in communication, or otherwise operating in combination or conjunction thereof, to perform the operations described, with the properties or functions thereof.

Where described or shown in a figure, flow labels, method steps, and flow of control might include
- one or more parallel flows of control, operating concurrently or in cooperation, in parallel or in a pipelined manner, or otherwise as known in the many fields of computing sciences and engineering,
- with the effect that the flow labels, method steps, flows of control, or operations might be performed or traversed in one or more orderings, whether directly specified in the figures or text, or as indicated therein as alternatives, or as substantially having the same properties or functions, or otherwise having substantially the same effect.

For example and without limitation, in the context of the invention, there is no particular requirement for the flow labels, method steps, flow of control, or operations, to occur in the order they are coupled or otherwise shown in the figures, or in the order they are described in the text.

Where distinct or separate data elements are shown as being used or operated upon, those distinct or separate data elements might be substantially so used or substantially so operated upon in parallel, in a pipelined manner, or otherwise.

Where an individual data element is shown as being used or operated upon, it might occur that the individual data element is substantially replicated, at least in part, with the effect that the individual data element might be used by more than one method step, flow of control, or operation, concurrently or in parallel or otherwise, consistently (or inconsistently with a form of reconciliation) or otherwise.

For example and without limitation, in the context of the invention, there is no particular requirement for the flow labels, method steps, flow of control, or operations, to occur in the order they are coupled or otherwise shown in the figures, or in the order they are described in the text. Where described or shown in a figure, or in the text, machines, articles of manufacture, or compositions of matter (or of matter and energy), might be disposed for including or maintaining, whether relatively permanently or relatively evanescently, or otherwise, information.

Where such information is specified, either relatively generally or relatively in detail, such information might be included or maintained by any technique involving the use of matter, combinations or conjunctions of matter and energy, techniques derived from computing sciences or information sciences, or other techniques in which such information might be derived or interpretable by one or more computing devices, at a later time or distinct place, or at another event in space-time. Although this description focuses on techniques for encoding information presently known to those skilled in the art, or where no such techniques are described, on techniques known in the many fields of computing science or information science, in the context of the invention, there is no particular requirement therefore. For example and without limitation, any and all such techniques for including or maintaining information, retrievable at a later time or distinct place, or at another event in space-time, might be applicable, even if currently not obvious to those of ordinary skill in the art.

Where such information is specified, that information might be included or maintained by any one or more coding schemas, or other techniques for maintaining information against error, loss, inaccessibility, or other issues, which should be generally inferred by the reader when construing or interpreting techniques described herein. For example and without limitation, techniques such as use of data backup or recovery, data mirroring, parity information, redundant encoding, triple-modular or other redundancy, and other methods known in the many fields of computing science or information science, should generally be implied by this description whenever inclusion, maintenance, transmission, copying, or other treatments of information are involved.

Where such information is specified, that information might be contemplated to be included or maintained with the effect of retaining that information for use in another context, at another place or time, in another device or in a similar or identical device otherwise distinct, or embodied in a form suitable for carriage or copying from a first place or time to a second place or time, such as on a device being at least in part electromagnetic, optical, physically configured, or making use of quantum-mechanical principles with respect to information.

Where such information is specified, that information might be segregated into individual portions, each representing whole number of bits, partial bits, probabilistic or conditionally probabilistic conditions from which information might be deduced, or otherwise. Although this description focuses on information-bearing articles which can be written, read, or transported in individual units, in the context of the invention, there is no particular requirement therefor.

For example and without limitation, information might be recorded, stored, or otherwise maintained on one or more physical elements or devices, with the information being separated either logically, physically, or holographically (the latter including the possibility that more than one such physical element or device might be involved in recovery or interpretation of the information).

For example and without limitation, in one embodiment, a system might include information with the property that any one individual device or even any one individual storage block is generally insufficient to allow a computing device to determine any one or more individual datum without reference to another device or storage block.

For example and without limitation, in one embodiment, an information-bearing element might include information that is encoded or encrypted with the property that any one individual device or even any one individual storage block is generally insufficient to allow a computing device to determine any one or more individual datum without reference to a decoding or decrypting key.

For example and without limitation, in one embodiment, an information-bearing element might include information that is accessible to a software component using a communication system, such as for example with the assistance of a coding system associated with a communication system, a communication protocol, an error-correcting code associated with an information-bearing element, a method or technique of associating or including data or information within a signal (such as for example a communication signal), or any one or more techniques known in the fields of computing science that might have the effect of allowing the recovery of information, either concurrently or at a later time.

Where such information is specified, that information might be interpretable by a computing device, or other data-processing device, as representing instructions to a device (including the possibility of a Turing-equivalent computing device operating under control of those instructions, either with or without additional instructions with the effect of providing additional functionality), as representing data to be compared, manipulated, reviewed, or otherwise processed by a device, as representing data describing a format of such data, such as for example a schema for a relational database, as representing metadata of some type, such as for example a measure of freshness or reliability of information, or otherwise, or combinations or conjunctions thereof.

For example and without limitation, in one embodiment, an information-bearing element might include information interpretable as hardware instructions, assembly-language instructions, compilable or interpretable higher-level language instructions, scripting instructions, or otherwise, or some combination or conjunction thereof.

For example and without limitation, in one embodiment, an information-bearing element might include information interpretable as a data encoding format, as a relational database schema or other database descriptor, as a data structure such as a tree structure, directed acyclic graph, heap storage, stack frame, or otherwise, or some combination or conjunction thereof.

For example and without limitation, in one embodiment, an information-bearing element might include data values to be compared, manipulated, reviewed, or otherwise processed by a device, such as for example a set of integers, floating-point numbers (for example, in an IEEE floating-point number standard format), data structures representing or indicative of other modelable elements, or otherwise, or some combination or conjunction thereof.

For example and without limitation, in one embodiment, an information-bearing element might include metadata of some type, such as for example a measure of freshness or reliability of information, a measure of precision or significance of figures, a measure of possible error, or otherwise, or combinations or conjunctions thereof.

Although this description is focused upon particular types of information as detailed herein, in the context of the invention, there is no particular requirement for any such limitation. For example and without limitation, there is no particular requirement that information or data need be represented in a digital format (an analog format might be a substitute), in a binary format (a format in a digital radix or other radix might be a substitute), in a time-division or space-division format (a format using a frequency-division or code-division format might be a substitute), or otherwise, or some combination or conjunction thereof.

FIG. 1

FIG. 1 shows a conceptual drawing of a system 100, including elements shown in the figure, including at least
- one or more communication networks 110;
- one or more distributed data structures 120;
- one or more configuration elements 130;
- one or more system resources 140; and
- one or more user stations 150.

Networked Environment

In one embodiment, the communication networks 110 might include any one or more techniques for computer communication, including a LAN, WAN, internet, enterprise network, a secure structure thereof such as a VPN, or otherwise.

While this application primarily describes systems 100 using a unified communication network 110, in the context of the invention, there is no particular requirement for any such limitation. For example and without limitation, elements shown in the figure might be coupled using more than one such communication network 110. Moreover, in the context of the invention, there is no particular requirement that the communication networks 110, where there are more than one of them, need be homogeneous, uniform, or even collectively compatible.

Elements shown in the figure are coupled to each other using one or more of the communication networks 110. The distributed data structures 120, configuration elements 130, system resources 140, and user stations 150 are capable of sending and receiving messages using one or more communication networks 110. This has the effect that elements associated with the system 100 can be logically or physically remote, yet capable of communication and of cooperation.

While this application primarily describes systems 100 in which each such element is coupled to each other one, in the context of the invention, there is no particular requirement for any such limitation. For example and without limitation, elements shown in the figure might merely be pairwise coupled, not necessarily each coupled to each other.

Configuration Database

The distributed data structures 120 include one or more configuration databases 121 maintained in the distributed system 100. For example and without limitation, the distributed data structures 120 might be maintained in a clustered file system or in a cloud computing format. The configuration databases 121 might be maintained in multiple portions on more than one resource 140 associated with, or accessible to, the system 100. The configuration databases 121 might also, or instead, be maintained in duplicate (or in partial duplicate) on more than one system resource 140 associated with, or accessible to, the system 100. This has the effect that the configuration databases 121 can be accessed by system resources 140 associated with, coupled to, or otherwise able to access, the system 100.

In one embodiment, the configuration databases 121 include one or more database tables, such as for example accessible using SQL, including data and information as described herein. For example and without limitation, such database tables might include one or more of the following:
- a set of database tables indicating a set of system configurations;
- a set of database tables indicating a set of system resources 140;

a set of database tables indicating a set of rollout and impact data, as described below;

a set of database tables indicating a set of tasks and tasklets, as described below;

a set of database tables indicating status of system resources 140, as described below;

some combination or conjunction thereof, or otherwise.

While this application primarily describes systems 100 in which the configuration databases 121 include database tables, in the context of the invention, there is no particular requirement for any such limitation. For example and without limitation, the configuration databases 121 might include object-oriented database elements, or other database elements as might be known in the many arts of computer science.

Configuration Information.

As described herein, the configuration databases 121 include one or more sets of configuration information 122, each indicative of a separate configuration for the system 100. While this application primarily describes systems 100 in which each such system configuration is substantially complete, in the context of the invention, there is no particular requirement for any such limitation. For example and without limitation, the configuration information 122 might be separable into more than one set of partial configuration information, such as the following:

a first set of partial configuration information for CIFS file servers and a second set of partial configuration information for NFS file servers;

a first set of partial configuration information for a North American enterprise campus and a second set of partial configuration information for a European enterprise campus;

a first set of partial configuration information for an accounting department and a second set of partial configuration information for an engineering department;

separate partial configuration information for each one of a set of multiple clusters, such as multiple cluster file systems; or some combination or conjunction thereof, or otherwise.

Of the sets of configuration information 122, a first such set 122a indicates information for a current valid state of the system 100 (sometimes referred to herein as an "active configuration" or "active version" of the system 100), while at least one additional such set 122b indicates information in construction for a future valid state of the system 100. One or more additional such sets 122c indicate information for past valid states of the system 100, such as for comparison when making changes from a past valid state to a current valid state, for later review of changes that were made, or for reversion to past states in the event of a change desired to be reversed.

Rollout and Impact Data.

Each set of configuration information 122 includes a set of one or more rollout files 123 (sometimes referred to herein as "configuration files" or "configuration rollout files"). The rollout files 123 might include configuration information, such as initialization information, interpretable by hardware devices and software elements at each system resource 140, as described herein. For example and without limitation, a rollout file 123 might include one or more of the following:

a configuration file indicating a process structure for a cloud computing architecture of a distributed system;

a configuration file indicating a file structure for a clustered file system;

a list of server devices capable of performing selected services in a distributed system, such as for example a DNS server list;

an initialization file indicating data or instructions for constructing or initializing processes or threads on one or more system resources 140;

a set of configuration or initialization files for separable elements of a distributed subsystem of the distributed system; or some combination or conjunction thereof, or otherwise.

Each set of configuration information 122 includes a set of impact data and instructions 124 (sometimes referred to herein as "impact data" or "impact information"). For example and without limitation, impact data 124 might include instructions to a particular system resource 140 to restart, with the effect that any new configuration information 122 is read and acted upon when the system resource 140 restarts.

In one embodiment, impact data 124 might include a "full" set of impact data 124 or an "incremental" set of impact data 124. A full set of impact data 124 would have the effect of substantially entirely changing a configuration of a system resource 140 to a next valid state. An incremental set of impact data 124 would have the effect of partially changing a configuration of a system resource 140 to a next valid state. For example and without limitation, if a system resource 140 has lagged behind in making configuration changes, as described below, a full set of impact data 124 would bring that system resource 140 to a configuration which is substantially the most current valid state, while an incremental set of impact data 124 would bring that system resource 140 to a configuration which is closer to a most current valid state, but not necessarily without any further changes required.

In one embodiment, impact data 124 might include an explicit or implicit ordering. For example and without limitation, a first set of impact data 124 and a second set of impact data 124, such as a set of configuration files to be applied to a particular system resource 140, might have a specified order. That order might be specified in a set of configuration information 122.

In one embodiment, the system 100 includes elements, such as for example the configuration element 130, which are capable of providing one or more such rollout files or impact data on command. This has the effect that users 154 at the user stations 150, as described below, might be able to inspect such rollout files or impact data, such as for example to determine if such rollout files or impact data have the content and format expected by such users 154.

Tasks and Tasklets.

The configuration databases 121 include a set of queued change requests 125, each of which indicates a change to be made to the system configuration. As described below, each such queued change request 125 is received from users 154 at user stations iso, and added to the queue. As each particular queued change request 125 is reached, the system 100 makes the configuration changes indicated by that particular queued change request 125.

Each queued change request 125 includes a set of task entries 126, each of which indicates a task to be performed in making a configuration change. Each such task entry 126 is associated with a task serial number 127. In one embodiment, such task serial numbers 127 are each unique and are assigned to new task entries 126 as they are created, in monotonically increasing order. In one embodiment, each newly-assigned task serial number 127 includes a next incremented value.

Each such task entry 126 includes, or is associated with, one or more tasklet entries 128, each of which indicates a tasklet to be performed in making a configuration change.

As described herein, each tasklet is performed by one system resource 140, while each task (and its task entry 126)

indicates a set of one or more tasklets, substantially all of which are to be performed as part of their associated task. In one embodiment, a tasklet might be (1) associated with a particular system resource 140, being marked completed when that particular system resource 140 completes that tasklet, or might be (2) assigned to be performed by any of the system resources 140, being marked completed when any system resource 140 completes that tasklet. In one embodiment, a tasklet might also be marked completed when the system 100 determines that the system resource 140 associated with that tasklet is unlikely to timely respond, as described herein.

Configuration Element

The configuration elements 130 include one or more software elements 131 executing on one or more hardware devices 132 associated with, coupled to, or accessible by, the system 100. In one embodiment, the software elements 131 include data and instructions capable of being interpreted by one or more computing devices, such as those hardware devices 132, to perform operations as described herein. In one embodiment, the hardware devices 132 include processors, program and data memory and mass storage, and one or more communication links to the communication network no.

In one embodiment, the configuration elements 130 perform software operations as described herein, using resources 140 accessible by, available to, or coupled to, the system 100. For example and without limitation, the configuration elements 130 direct particular resources 140 to perform tasks and tasklets as described herein, to update configuration information at those resources 140, with the effect of making changes to configuration information for the system 100. The configuration elements 130

While this application is primarily directed to cases in which there is one such configuration element 130, in the context of the invention, there is no particular requirement for any such limitation. For example and without limitation, there might be multiple such configuration elements 130, which might operate independently or which might operate cooperatively.

In one embodiment, the software elements 131 for the configuration element 130 include a system process (sometimes referred to herein as a "daemon" or a "system daemon") operating under control of operating system software executing on their associated hardware devices 132. In one embodiment, at least a portion of that system daemon operates at a relatively privileged operating level within that operating system.

The system daemon associated with the configuration element 130 directs changes to the configuration information 120, such as for example modifying the configuration databases 121 to add items to the queued change requests 125 (including task entries 126 and tasklet entries 127), and modifying the configuration databases 121 to reflect completion, or substantial completion, of tasks and tasklets.

Individual Resources

The system resources 140 each include a communication port, coupled to the communication networks no. System resources 140 might include a computing device 141, including a processor, memory and mass storage, and data and instructions. System resources 140 might include a storage device 142, including memory and mass storage, and capable of maintaining information in response to storage instructions and retrieval instructions. System resources 140 might also include other and further hardware devices or software elements. For example and without limitation, system resources 140 might include a clock or other timing device, or otherwise.

As described herein, system resources 140 include the most general set of hardware devices, software elements, or other capabilities that might be associated with, coupled to, or accessible by, the system 100. For example and without limitation, system resources 140 might include input/output elements (such as for example conference room whiteboards), sensors (such as for example external sensors), servers (such as for example DNS servers, HTTP servers, NFS or other file system servers, or otherwise), storage elements (such as for example individual mass storage devices, or a set of mass storage devices operating collectively such as a RAID storage system or a cloud storage element, or otherwise), workstations, combinations or conjunctions thereof, or otherwise.

User Stations

The user stations 150 each include a communication port, coupled to the communication networks no. User stations 150 might include a computing device 151, including a processor, memory and mass storage, and data and instructions. User stations 150 might include a storage device 152, including memory and mass storage, and capable of maintaining information in response to storage instructions and retrieval instructions. User stations 150 might also include other and further hardware devices or software elements. For example and without limitation, user stations 150 might include a dock or other timing device, or otherwise.

The user stations 150 each include a set of input elements 153, such as for example a keyboard and a pointing device, and a set of output elements, such as for example a synchronized audio output and video output. This has the effect that user stations 150 can be directed by a user 154, such as for example a human operator. While this application is primarily directed to cases in which the user 154 includes a human operator, in the context of the invention, there is no particular requirement for any such limitation. For example and without limitation, the user 154 might include a group of persons or other entities with individual or collective authority to direct user stations 150, might include one or more computer programs or scripts having the property of directing user stations 150, or might include an artificial intelligence or a machine learning system capable of directing user stations 150.

The user stations 150 operate to present configuration information 120 to users 154, such as for example a set of configuration information 120 relating to a current valid state of the system 100. The user stations 150 recognize a set of configuration changes in progress, and are able to operate to present to users 154 configuration information 120 relating to future states of the system 100 that are not yet valid, including what configuration changes are pending between the current valid state and those future states, and what state would result from those pending configuration changes. Similarly, the user stations 150 recognize a set of states that were valid at past times, and are able to present to users 154 configuration information 120 relating to past states of the system 100 that are no longer valid, and what configuration changes occurred from those past states to the current valid state.

The user stations 150 operate to receive configuration changes from users 154, either in the form of particular changes to make, or in the form of a new state of the system 100 to achieve. In the latter case, the user stations 150 determine what differences exist between the current valid state and the desired new state, identifying those differences as a set of particular changes to make.

Having received or identified such changes to make, the user stations 150 call upon the configuration element 130 to add a set of queued change requests 125 to the configuration database 121. Having called upon the configuration element 130 to add queued change requests 125 to the configuration database 121, the user stations 150 respond to users 154 that the changes have been queued. In such cases, the user stations 150 show users 154 the newly-changed state of the system 100 as if those changes had already been made. This has the effect that users 154 might operate the user stations 150 to present further configuration changes to be made.

Should users 154 identify such further configuration changes, the user stations 150 receive those further configuration changes, call upon the configuration element 130 to add queued change requests 125, and present the further newly-changed state of the system 100 to users 154 as if those changes had already been made. This has the effect that users 154 might continue to identify further configuration changes while the system 100 is still making earlier configuration changes that were requested by the user 154.

In one embodiment users 154 at user stations 150 might lock the configuration database 121, with the effect of preventing configuration changes to the system 100 for a selected time duration. For a first example and without limitation, it might be desirable to prevent configuration changes for administrative reasons, such as to assure that only particular users 154 are authorized to make configuration changes for a selected time duration. For a second example and without limitation, it might be desirable to prevent configuration changes for a selected time duration while the system 100 is updated.

FIG. 2

FIG. 2 shows a conceptual drawing of a method 200, including flow labels and method steps as shown in the figure.

As described herein, the method steps are shown in the figure and described in a linear order. However, in the context of the invention, there is no particular requirement that the flow labels or method steps be encountered or performed linearly, in any particular order, or by any particular device. For example and without limitation, the flow labels and method steps might be encountered or performed in parallel, in a pipelined manner, by a single device or by multiple devices, by a general-purpose processor or by a special-purpose processor (or other special-purpose circuitry disposed for carrying out part or all of the method 200), by one or more processes or threads, at one or more locations, and in general, using any one or more of the techniques known in the many arts of computing science.

Beginning of Method

Reaching a flow label 200A indicates a beginning of the method 200.

At a step 201, the method 200 is triggered and begins operation. In various embodiments, the method 200 might be triggered by any circumstance in which it is desirable to perform one or more configuration changes to the system 100, such as for example, one or more of the following:

a change in the structure of the system 100, such as for example an upgrade to the system 100;

a command or other intervention by a user, such as for example an explicit command to perform one or more configuration changes to the system ism;

any other technique or trigger, such as for example any of those known in the many fields of computing science.

While this description is at least partially directed to embodiments with respect to specific techniques for triggering the method 200, such as in this step, in the context of the invention, there is no particular requirement for any such limitation. The method 200 might be triggered, such as in this step, by any technique suitable for triggering a computation, method, or process.

The method 200 proceeds with the flow label 210.

Configuration User Interface

Reaching a flow label 210 indicates that the method 200 is ready to receive configuration changes from users 154 at user stations 150.

At a step 211, user stations 150 present configuration information 120 to users 154. To perform this step, the method 200 might perform the following substeps:

At a substep 211a, user stations 150 determine if there are any pending commands for configuration changes from users 154. If not, the method 200 performs the next substep. If so, the method 200 proceeds with the substep 211c.

At a substep 211b, user stations 150 present configuration information 120 to users 154 relating to a current valid state of the system 100. The method 200 proceeds with the next step.

At a substep 211c, user stations 150 respond to users 154 to the user with an acknowledgement of receipt of those commands for configuration changes, and with an acknowledgement that the commands are about to be performed In one embodiment, at a substep 211d, user stations 150 present configuration information 120 to users 154 relating to a future intended state of the system 100, after all pending requests for configuration changes have been completed. Such a future intended state is not yet valid, but is presented to users 154 as if requisite changes had been completed and that future intended state was valid. The method 200 proceeds with the next step.

At a step 212, user stations 150 receive requests for (original or further) configuration changes from users 154.

At a step 213, user stations 150 determine what differences exist between the current valid state and the desired new state indicated by users 154.

At a step 214, user stations 150 call upon the configuration element 130 to add a set of queued change requests 125 to the configuration database 121. This has the effect that those queued change requests 125 will eventually be performed and the requested configuration changes from users 154 will be made valid.

The method 200 returns to the flow label 210 to present further configuration information 120 to users 154, and possibly to receive further requests for configuration changes from users 154.

This has the effect that the configuration user interface (sometimes referred to herein as the "configuration UI") is asynchronous, at least in the sense that the configuration UI does not require that user 154 at user stations 150 must wait for any particular event to present further configuration changes for the system 100. This also has the effect that configuration changes for the system 100, as requested by users 154 at user stations 150, are performed substantially in parallel by system resources 140 associated with the system 100.

In one embodiment, the configuration UI might be constructed using a "THRIFT" compiler technique.

In such cases, a configuration UI might be constructed substantially as follows:

One or more system designers specify an API (application programming interface) with which a configuration UI might be implemented.

The system designers cause a THRIFT compiler to receive the specified API.

The THRIFT compiler generates, in response to the specified API, a set of client/server calls, which have an effect of implementing the specified API.

The system designers prepare a configuration UI which receives a set of inputs from users 154 and presents a set of outputs to such users 154.

The configuration UI calls upon the client/server calls generated by the THRIFT compiler to perform operations shown by the configuration UI.

Configuration Changes

Reaching a flow label 220 indicates the method 200 is ready to make configuration changes.

At a step 221, the configuration element 130 identifies one or more tasks to be performed to make the queued change requests 125.

At a step 222, the configuration element 130 constructs configuration information 122, each indicative of a separate configuration and each uniquely identified, for each set of queued change requests 125.

In one embodiment, the configuration element 130 associates a unique configuration number with each such separate configuration; however, in the context of the invention, there is no particular requirement for any such limitation. For example and without limitation, the configuration element 130 might associate a time value, such as a time when that separate configuration was associated with a set of queued change requests 125, or such as a time when that separate configuration was made valid.

As described above, one such separate configuration is identified as a current configuration 122a. An identifier for the current configuration 122a (whether a configuration number, time value, or other indicator) for the current configuration 122a is distributed to substantially all system resources 140 involved in making configuration changes to reach that current configuration 122a. The same identifier for the current configuration 122a is maintained in the configuration database 121, with the effect that each particular system resource 140 can determine if it is up-to-date with all configuration changes to reach the current configuration 122a.

At a step 223, the configuration element 130 identifies one or more separate tasks, each uniquely identified, to be associated with transforming configuration information 122 from a first separate configuration to a second separate configuration. For example and without limitation, an individual task might include modifying rollout files for a type of system resource 140.

In one embodiment, the configuration element 130 associates a unique task number with each such separate task; however, in the context of the invention, there is no particular requirement for any such limitation. For example and without limitation, the configuration element 130 might associate a time value, such as a time when that separate task was associated with a set of configuration information, or such as a time when that separate task was initiated.

At a step 224, the configuration element 130 identifies one or more separate tasklets, each uniquely identified, to be associated with each task identified above.

As noted above, a first type of tasklet might be associated with a particular system resource 140. For example and without limitation, an individual tasklet might include modifying a rollout file for a particular system resource 140.

As noted above, a second type of tasklet might be associated with no particular system resource 140; it simply is assigned to be performed by any system resource 140, so long as it is performed by one of them. For example and without limitation, an individual tasklet might include writing a particular status to a configuration database 121.

In one embodiment, individual tasks might include one or more such tasklets. In cases in which a particular task includes more than one such tasklet, that particular task is deemed completed when substantially all of its associated tasklets are completed. This latter item is subject to treatment of non-responsive nodes, as described below.

At a step 225, the configuration element 130 associated rollout and impact data with each particular tasklet.

Non-Responsive Nodes

Detection.

Reaching a flow label 230 indicates the method 200 is ready to act upon a non-responsive node.

At a step 231, the method 200 identifies a non-responsive system resource 140. To perform this step, the method 200 performs the following substeps:

At a substep 231a, the configuration database 121 includes one or more incomplete tasklets. In one embodiment, each such tasklet is associated with information indicating a time when the tasklet was assigned, indicating a time duration during which the tasklet has not been completed, or otherwise indicating whether the tasklet is not making sufficient progress.

At a substep 231b, the configuration element 130 identifies one or more particular tasklets not having made sufficient progress.

At a step 232, the method 200 marks the non-responsive system resource 140 as being "stale." While being marked "stale" does not necessarily indicate that a particular system resource 140 has failed, in one embodiment, the configuration element 130 would generally proceed as if that particular system resource 140 is not going to ever timely respond.

In one embodiment, the configuration element 130 modifies the configuration database 121 to indicate that the tasklet is being skipped.

In one embodiment, the method 200 performs the test for non-responsiveness and marking the non-responsive node as being "stale" atomically, that is, without any substantial possibility of action occurring in the middle of such an operation.

At a step 233, the method 200 skips the tasklet. As part of this step, the method 200 proceeds to make configuration changes as if those particular tasklets had run to completion.

Recovery.

Reaching a flow label 24o indicates the method 200 is ready to act upon formerly non-responsive node (sometimes referred to herein as a "newly-recovered" or "recovering" node). At a step 241, the method 200 identifies that a newly-recovered node has been marked "stale."

To perform this step, the method 200 performs the following substeps:

At a substep 241a, the newly-recovered node determines that it has been marked "stale" in the configuration database 121.

At a substep 241b, the newly-recovered node determines that it is able to proceed despite having been marked "stale" in the configuration database 121.

At a step 242, the method 200 marks the newly-recovered node as being "recovering." While being marked "recovering" does not necessarily indicate that a particular system resource 140 is now fully operational, in one embodiment, the configuration element 130 would generally proceed as if that particular system resource 140 is going to catch up with substantially all queued configuration changes 125.

At a step 243, the method 200 recovers the "recovering" node. To perform this step, the method 200 performs the following substeps:

At a substep 243a, the method 200 performs operations as the recovering node while that node remains marked "recovering" in the configuration database 121.

At a substep 243b, the method 200 determines that the recovering node has caught up with substantially all queued configuration changes 125.

At a substep 243*c*, the method 200 marks the recovering node as "OK" in the configuration database 121.

The method 200 proceeds with the flow label 200B.

End of Method

Reaching a flow label 200B indicates an end of the method 200.

In one embodiment, the method 200 might be readied for re-performance in response to a trigger as described with respect to the flow label 200A.

Alternative Embodiments

The invention has applicability and generality to other aspects of distributed system management.

The invention claimed is:

1. A method, including steps of
receiving commands indicating one or more configuration changes associated with a distributed system including a plurality of nodes, each said configuration change including modification of at least one of: configuration information associated with said distributed system, configuration information associated with at least one said node;
determining one or more tasks to make configuration changes, each said task including a consistent change to said configuration information;
determining for each said task one or more tasklets to perform said task, each said tasklet performable at a single said node, and one or more target nodes at which to perform a copy of each said tasklet.

2. A method as in claim 1, wherein
said steps of determining for each said task include steps of selecting a tasklet to be performed by any one of said nodes.

3. A method as in claim 1, including steps of
identifying a node assigned a tasklet as substantially non-responsive;
wherein said steps of identifying each said task as complete are responsive to a result of said steps of identifying a node assigned a tasklet as substantially non-responsive.

4. A method as in claim 3, including steps of
at a node, recognizing a former non-responsive state;
at said node, catching up with configuration changes;
identifying said node as being current with said distributed system.

5. A method as in claim 1, including steps of
maintaining information indicating said tasks and tasklets in a distributed database in said system;
maintaining, associated with said tasks and tasklets, said at least one of: configuration information associated with said distributed system and configuration information associated with a node associated with said distributed system;
maintaining, for each said task, information indicating whether said task is substantially complete;
maintaining, for each said tasklet, information indicating a target node associated with said tasklet.

6. A method as in claim 5, wherein
for each said task, indicating at most one tasklet associated with any said node, of a selected type, in said distributed system.

7. A method as in claim 5, wherein
for each said task, said steps of indicating whether said task is substantially complete are responsive to each tasklet associated with said task being at least one of:
substantially complete, associated with a non-responsive said node.

8. Apparatus including
a distributed system including a plurality of nodes, at least one said node including a user interface disposed to receive commands indicating one or more configuration changes associated with said distributed system, each said configuration change including modification of at least one of: configuration information associated with said distributed system, configuration information associated with at least one said node;
said distributed system including a distributed data structure, said data structure indicating one or more tasks to make said configuration changes, each said task including a consistent change to said configuration information, each said task indicating one or more tasklets to perform said task;
each said tasklet performable at a single said node, each said task indicating one or more target nodes at which to perform a copy of each said tasklet;
said distributed system including a configuration element, said configuration element disposed to perform copies of each said tasklet asynchronously at substantially all said target nodes, and disposed to identify each said task as complete in response to said performing of copies.

9. Apparatus as in claim 8, wherein
said data structure indicates a particular tasklet as complete in response to a node assigned said particular tasklet being substantially non-responsive.

10. Apparatus as in claim 9, wherein
said data structure indicates a particular node as recovering, in response to said particular node recognizing having been indicated as non-responsive.

11. Apparatus as in claim 9, wherein
said data structure indicates a particular node as recovered, in response to said particular node having caught up with a current said configuration change.

12. Apparatus as in claim 9, wherein
for each said task, said data structure indicating at most one tasklet associated with any node, of a selected type, in said distributed system.

13. A non-transitory physical medium maintaining information interpretable by a computing device as instructions, said instructions directing said computing device to
receive commands indicating one or more configuration changes associated with a distributed system including a plurality of nodes, each said configuration change including modification of at least one of: configuration information associated with said distributed system, configuration information associated with at least one said node;
determine one or more tasks to make said configuration changes, each said task including a consistent change to said configuration information;
determine for each said task one or more tasklets to perform said task, each said tasklet performable at a single said node, and one or more target nodes at which to perform a copy of each said tasklet;
perform copies of each said tasklet asynchronously at substantially all said target nodes;
identify each said task as complete in response to a result of said instructions to performing.

14. A physical medium as in claim 13, wherein
said instructions to determine for each said task include instructions to select a tasklet to be performed by any one of said nodes.

15. A physical medium as in claim 13, including
instructions to identify a node assigned a tasklet as substantially non-responsive, wherein
said instructions to identify each said task as complete are responsive to said instructions to identify a node assigned a tasklet as substantially non-responsive.

16. A physical medium as in claim 13, including
instructions to, at a node, recognize a former non-responsive state;
instructions to, at said node, catch up with configuration changes;
instructions to identify said node as being current with said distributed system.

17. A physical medium as in claim 13, including instructions to
maintain information indicating said tasks and tasklets in a distributed database in said system;
maintain, associated with said tasks and tasklets, said at least one of: configuration associated with said distributed system and configuration information associated with a node associated with said distributed system;
maintain, for each said task, information indicating whether said task is substantially complete;
maintain, for each said tasklet, information indicating a target node associated with said tasklet.

18. A physical medium as in claim 17, wherein
for each said task, said instructions to indicate identify at most one tasklet associated with any said node, of a selected type, in said distributed system.

19. A physical medium as in claim 17, wherein
for each said task, said instructions to indicate whether said task is substantially complete are responsive to each tasklet associated with said task being at least one of: substantially complete, associated with a non-responsive said node.

20. A non-transitory physical medium including non-transitory information interpretable by a computing device as instructions, said instructions directing said computing device to
maintain a distributed system including a plurality of nodes, at least one node including a user interface disposed to receive commands indicating one or more configuration changes associated with said distributed system, each said configuration change including modification of at least one of: configuration information associated with said distributed system, configuration information associated with at least one said node;
maintain in said distributed system a distributed data structure, said data structure indicating one or more tasks to make said configuration changes, each said task including a consistent change to said configuration information, each said task indicating one or more tasklets to perform said task, each said tasklet performable at a single said node, each said task indicating one or more target nodes at which to perform a copy of each said tasklet;
maintain in said distributed system a configuration element, said configuration element disposed to perform copies of each said tasklet asynchronously at substantially all said target nodes, and disposed to identify each said task as complete in response to said performing of copies.

21. A physical medium as in claim 20, wherein
said data structure indicates a particular tasklet as complete in response to a node assigned said particular tasklet being substantially non-responsive.

22. A physical medium as in claim 21, wherein
said data structure indicates a particular tasklet as recovering, in response to said particular node recognizing having been indicated as non-responsive.

23. A physical medium as in claim 21, wherein
said data structure indicates a particular tasklet as recovered, in response to said particular node having caught up with a current said configuration change.

24. A physical medium as in claim 21, including instructions to
for each said task, said data structure indicating at most one tasklet associated with any node, of a selected type, in said distributed system.

* * * * *